United States Patent
Baldauf et al.

(10) Patent No.: US 7,470,340 B2
(45) Date of Patent: Dec. 30, 2008

(54) METHOD FOR THE PRODUCTION OF A LAMINATE CLOSURE MATERIAL

(75) Inventors: Georg Baldauf, Laer (DE); Marcus Schönbeck, Versmold (DE)

(73) Assignee: Nordenia Deutschland Gronau GmbH, Gronau (DE)

( * ) Notice: Subject to any disclaimer, the term of this patent is extended or adjusted under 35 U.S.C. 154(b) by 395 days.

(21) Appl. No.: 11/128,602

(22) Filed: May 13, 2005

(65) Prior Publication Data

US 2006/0162843 A1  Jul. 27, 2006

(30) Foreign Application Priority Data

Jan. 26, 2005  (EP)  ................................ 05001532

(51) Int. Cl.
    *B32B 37/00*  (2006.01)
(52) U.S. Cl. ................ 156/73.1; 156/229; 156/244.11
(58) Field of Classification Search ............... 156/73.1, 156/229, 494, 495, 496, 554, 555, 582, 179, 156/242, 244.11
    See application file for complete search history.

(56) References Cited

U.S. PATENT DOCUMENTS

| 4,446,189 A | 5/1984 | Romanek |
| 4,834,741 A | 5/1989 | Sabee |
| 5,683,787 A * | 11/1997 | Boich et al. ................. 428/198 |
| 5,817,199 A * | 10/1998 | Brennecke et al. ......... 156/73.1 |

FOREIGN PATENT DOCUMENTS

| DE | 4243012 | 6/1994 |
| EP | 0 707 106 A | 4/1996 |
| WO | WO 90 03464 | 5/1990 |
| WO | WO 98/16380 | 4/1998 |

\* cited by examiner

*Primary Examiner*—James Sells
(74) *Attorney, Agent, or Firm*—Collard & Roe, P.C.

(57) ABSTRACT

A method for the production of a fleece laminate material that has elastic regions and non-elastic regions. In the method, parallel strips of elastic laminate are laminated in between two webs of nonwoven material, at a distance from one another and the nonwoven webs are directly bonded to one another, in the regions between the strips, and form non-elastic regions. The segments of the fleece laminate material that contain a strip, in each instance, form elastic regions. According to the invention, the elastic laminate has a tacky elastomer core layer and at least one non-blocking outer layer of nonwoven material, applied to the tacky core layer.

7 Claims, 2 Drawing Sheets

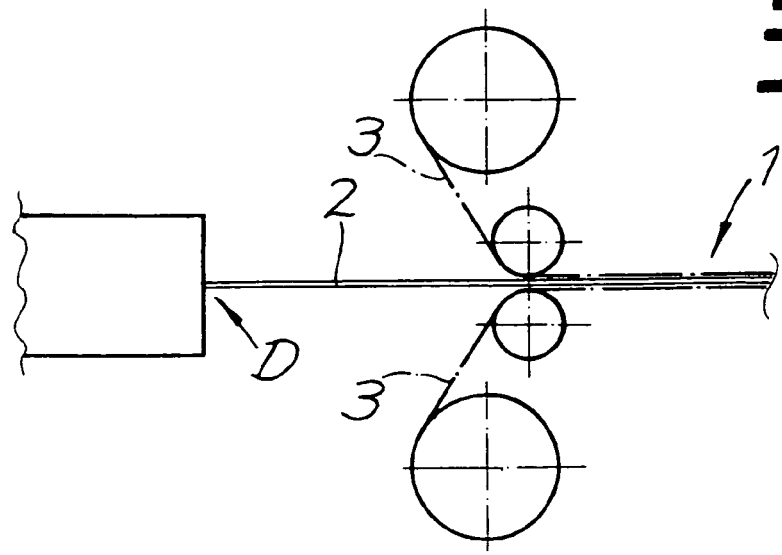
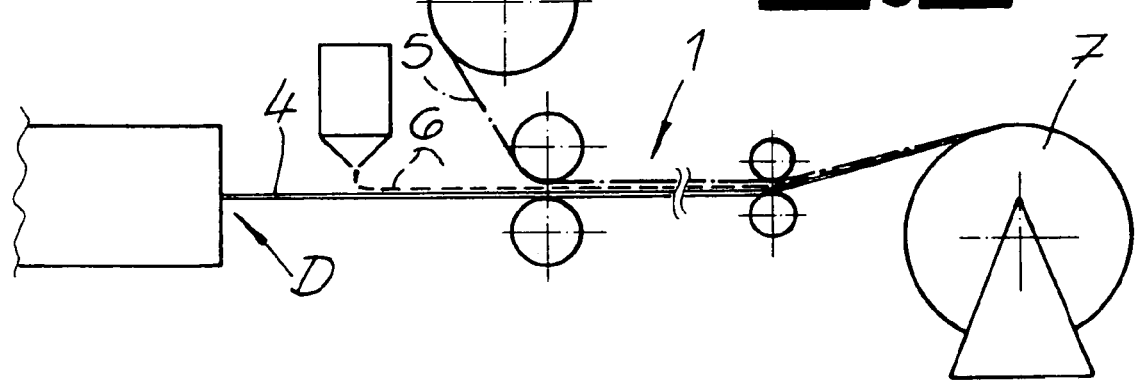
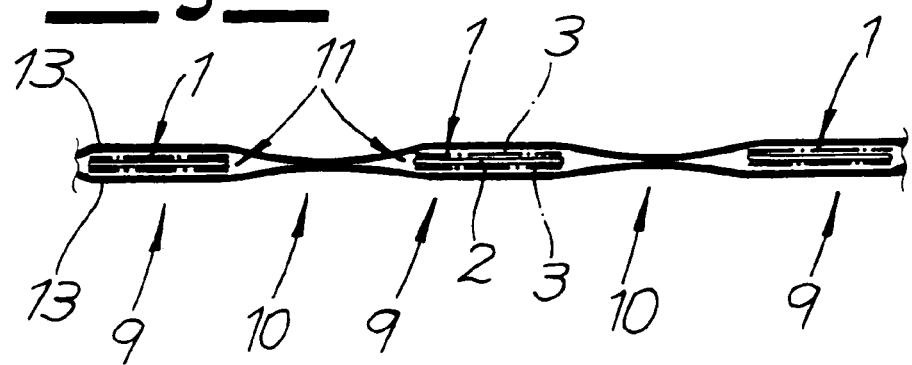

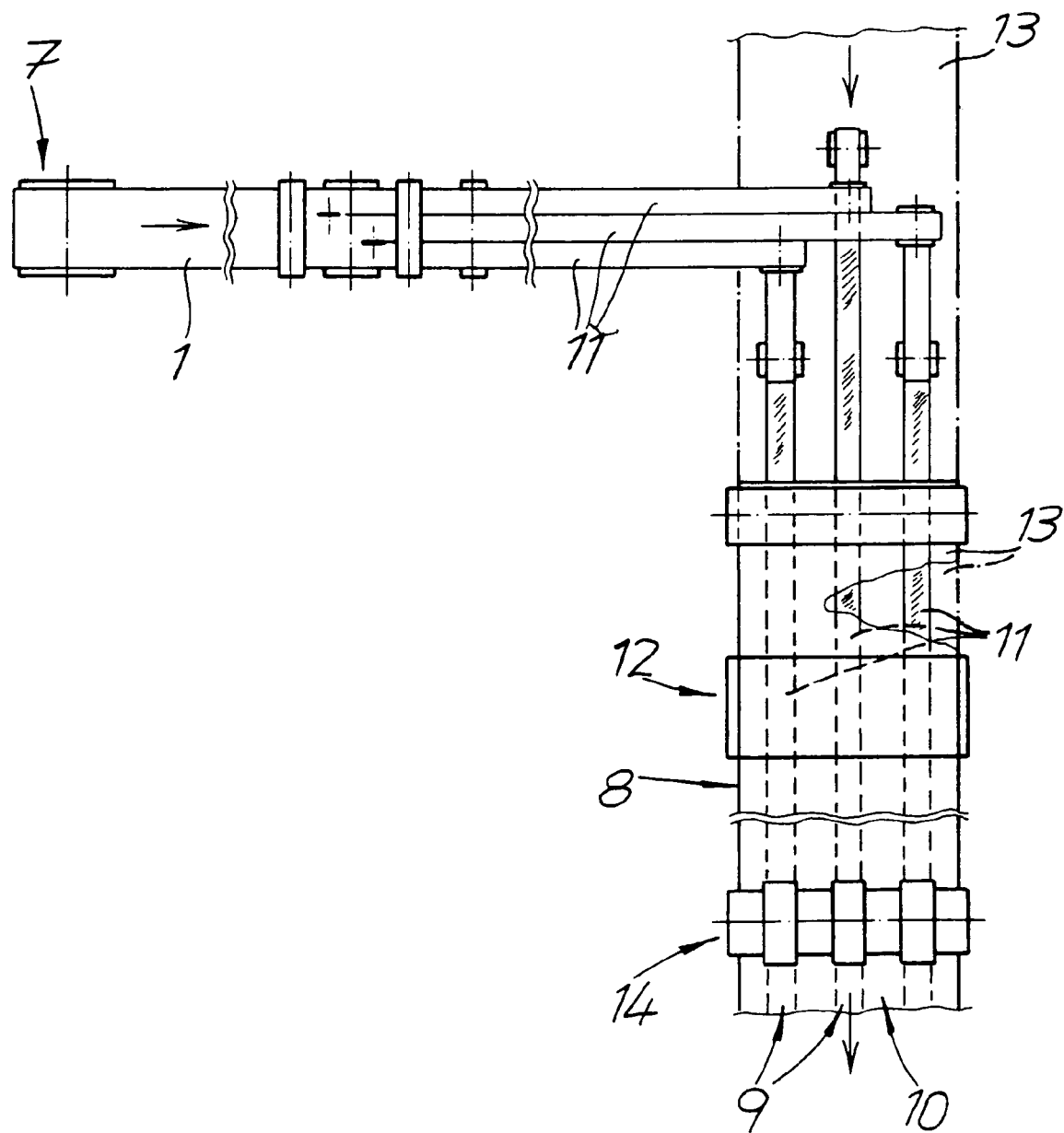

METHOD FOR THE PRODUCTION OF A LAMINATE CLOSURE MATERIAL

BACKGROUND OF THE INVENTION

1. Field of the Invention

The invention relates to a method for the production of a fleece laminate material that has elastic regions and non-elastic regions. Parallel strips of elastic laminate are laminated in between two webs of nonwoven material, at a distance from one another, whereby the nonwoven webs are directly bonded to one another in the regions between the strips, and form non-elastic regions. The segments of the fleece laminate material that contain a strip form elastic regions. "Nonwoven" refers to a textile fiber material made of irregularly laid fibers that are bonded cohesively or adhesively to form a flat material.

2. The Prior Art

Fleece laminate material can be used as an elastic closure strip for baby diapers, for example, which can also have the shape of diaper ears and have an elastic center region as well as less elastic end segments that follow it on both sides. The non-elastic or less elastic end regions are utilized to attach closure elements, e.g. hook tapes, and to affix the closure strip to the diaper chassis. For cost-effective production, a great number of elastic strips are laminated in between broad webs of nonwoven, at a distance from one another. The closure strips required for diaper production are cut from the resulting multi-use fleece laminate material.

Within the scope of the known measures, the elastic strips laminated into the fleece laminate material consist of elastic films. Possible film materials are elastomers, e.g. SBS block copolymers, SIS block copolymers, polyurethane, ethylene copolymers and the like. Elastomer monofilms made of the stated materials are tacky. In order to be able to use them as rolled goods, a release liner has to be used, which covers the elastomer layer on at least one surface. The release liner consists, for example, of silicone paper, and serves as a temporary processing aid. In the processing of a film material, it is removed and wound up for disposal or re-use. Only afterwards can the elastic film be laminated to the nonwoven web. The handling of a monofilm covered with a release liner is complicated. In addition, there is the problem that elastic monofilms have a high elastic stretch in the machine running direction and are stretched in the longitudinal direction at high laminating speeds. After the laminate was glued, the elastic monofilm relaxes, as soon as no web tension is present any longer. This results in uncontrolled and undesirable wrinkle formation of the laminate material.

Within the scope of the known measures, co-extrusion films were frequently used for the stated reasons, which films have a tacky elastomer core layer and an outer layer of a non-blocking synthetic, e.g. a polyolefin. The outer layer, also called a skin layer, allows better processing and handling of the elastic film, but does not make any contribution to the desired properties of the fleece laminate material. This is additional material that neither improves the elastic properties of the laminate material nor makes any contribution to the textile nature of the material that is being aimed at.

SUMMARY OF THE INVENTION

With this background, it is object of the invention to provide a method for the production of a fleece laminate material that is elastic in certain regions, which allows problem-free and simple conduct of the method. In comparison with the fleece laminate materials that contain a co-extrusion film as the elastic core, the product of the method demonstrates greater elasticity, at the same weight per area unit.

This task is accomplished, according to the invention, in that the elastic laminate has a tacky elastomer core layer and at least one non-blocking outer layer of nonwoven material, applied to the tacky core layer. The outer layer of nonwoven material is not elastic in the web direction and furthermore acts as a release layer towards the tacky film surface of the next layer, in the rolled-up form. The outer layer of the laminate, consisting of nonwoven material, allows processing of the laminate from the roll. During further processing, the elastic laminate having the outer layer is laminated in between the webs, which also consist of nonwoven material. The elastic laminate must be guided from the roll-off station to the laminating station, where it is introduced between the nonwoven webs, by way of a plurality of deflection devices. For guidance of the web, it is sufficient if the elastic laminate has a non-blocking outer layer of nonwoven material on only one outer surface.

The tacky core layer and the outer layer of the elastic laminate that consists of nonwoven can be bonded by extrusion lamination, by means of adhesive lamination, or over part of the area, by means of ultrasound.

Even a thin outer layer of nonwoven, having a low weight per area unit, allows processing of the elastic laminate from the roll and thereby fulfills the function assigned to it. Preferably, the weight per area unit of the outer layer of the laminate material that consists of nonwoven material is therefore less than the weight per area unit of the webs laminated onto the laminate. According to a preferred embodiment of the invention, the nonwoven material forming the outer layer of the elastic laminate has a weight per area unit between 5 g/m$^2$ and 15 g/m$^2$, while the webs laminated onto the laminate have a weight per area unit of more than 15 g/m$^2$, in each instance, preferably a weight per area unit of 20 g/m$^2$ to 35 g/m$^2$. For the production of a firm laminate, and good functional properties of the fleece laminate material, it is particularly advantageous if the outer layer of the elastic laminate and the webs laminated onto the laminate consist of the same raw material. Possible raw materials are polyolefins, for example. With regard to the textile technology characteristics, the outer layers of the elastic laminate and the nonwoven webs laminated onto the outside can differ. It is practical if the outer layer of the elastic laminate has a dense fiber structure, whereas the nonwoven webs that are laminated on can have a loose fiber structure that is as voluminous as possible.

The core layer of the elastic laminate is preferably formed by a monofilm from the group of styrene-isoprene-styrene block copolymers, styrene-butadiene-styrene block copolymers, styrene-ethylene/butylene-styrene block copolymers, polyurethane copolymers or ethylene copolymers.

The elastic laminate can be pulled off from a roll as a broad web, and cut into strips. The strips are guided by way of deflection devices and passed to a laminating device as parallel strips, spaced apart from one another; the strips are laminated in between the two webs of nonwoven there. In a subsequent processing station, the fleece laminate material can be stretched crosswise to the web direction, in the elastic regions, preferably by means of ring rolling in a stretching roller array. Corresponding stretching roller arrays are known, for example, from U.S. Pat. No. 4,834,741. Under the effect of stretching rollers, the fleece laminate material is stretched in the crosswise direction to the web running direction. The stretching of the elastomer core layer of the strips laminated in is reversible, and the nonwoven layers are irreversibly stretched. After the fleece laminate material has passed through the stretching device, the elastic layer contracts, and the stretched layers that do not elastically recover form buckled regions that increase the volume of the nonwoven layers. By means of the stretching referred to as ring rolling, the stretching resistance of the fleece laminate material is reduced in the elastic regions.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows a method for the production of an elastic laminate produced by means of extrusion lamination, which is used as an elastic core for a fleece laminate material, FIG. 2 shows a method for the production of an elastic laminate by means of adhesive lamination, which is used as an elastic core for a fleece laminate material, FIG. 3 shows a method for the production of a fleece laminate material that is elastic in certain regions, using the preliminary product produced according to FIG. 1 or 2, and FIG. 4 shows a cross-section through a product of the method, which was produced according to the method shown in FIG. 3.

DETAILED DESCRIPTION OF THE PREFERRED EMBODIMENT

Referring now in detail to the drawings, FIG. 1 shows a method for the production of an elastic laminate 1, which has a tacky elastomer core layer 2 and at least one non-blocking outer layer 3 of nonwoven material, applied to the tacky core layer. Elastic laminate 1 has an outer layer 3 of nonwoven material on both sides, in each instance. Core layer 2 is a monolayer of an elastomer synthetic, e.g. from the group of styrene-isoprene-styrene block copolymers, styrene-butadiene-styrene block copolymers, styrene-ethylene/butylene-styrene block copolymers, polyurethanes or ethylene copolymers. Material webs of nonwoven material 3 run towards the film web, which is still hot, right behind extrusion die D, and are extrusion-laminated under pressure.

Outer layer 3 consisting of nonwoven material is applied to the tacky elastomer core layer 2 by means of adhesive lamination. Such a method variant is shown in FIG. 2. A monofilm 4 of an elastomer is produced by means of extrusion. Before monofilm 4 is rolled up, a material web 5 of nonwoven material is laminated against elastomer film 4 with an adhesive 6, preferably a hot-melt glue. The adhesive can be applied over the entire area, in dots, or in stripes. In the exemplary embodiment, an elastic laminate 1 is produced, which has a non-blocking outer layer 3 of nonwoven material on one side. The material is rolled up into a roll 7. Nonwoven layer 3 forms a release layer within the roll, and prevents blocking of the tacky elastomer film.

Elastic laminate 1 produced according to FIG. 1 or FIG. 2 is processed as rolled goods and is used for the production of a fleece laminate material 8 that has elastic regions 9 and non-elastic regions 10. The method for the production of the fleece laminate material is shown schematically in FIG. 3. Elastic laminate 1 is pulled off from a roll 7 and cut into strips 11. Strips 11 are guided by way of deflection devices and passed to a laminating device 12 as parallel strips spaced at a distance from one another. In the device, the strips are laminated in between two webs 13 of nonwoven material. Nonwoven webs 13 are directly bonded to one another in the regions between strips 11, and form non-elastic regions 10 there. The segments of the fleece laminate material that contain a strip 11, in each instance, form elastic regions 9. In a station 14 that follows the laminating system, fleece laminate material 8 is stretched crosswise to the web direction in elastic regions 9, by means of ring rolling. For ring rolling, a stretching roller array of profiled rollers is used. Under the effect of the stretching rollers, the fleece laminate material is stretched in the crosswise direction relative to the web movement direction, whereby the stretching of elastic layer 2 is reversible, and outer nonwoven layers 13 are irreversibly stretched. After the fleece laminate material has passed through the stretching device, the elastic layer contracts, whereby stretched nonwoven layers 13, which cannot recover elastically, form buckled regions that increase the volume of the outer layers. The material is characterized by a low resistance to stretching in elastic regions 9, as well as by a textile surface, and can be processed further to produce elastic diaper closures.

FIG. 4 shows a cross-section through the product of the method, which has been produced using the method shown in FIG. 3. The fleece laminate material has parallel strips 11 of elastic laminate 1, which have been laminated in between two webs 13 of nonwoven material 13, at a distance from one another. The nonwoven webs 13 are directly bonded to one another in the regions between strips 11, and form non-elastic regions 10 there. The segments that contain a strip 11, in each instance, form elastic regions 9. Strips 11 have a tacky elastomer core layer 2 and a non-blocking outer layer 3 of nonwoven material applied to the tacky core layer 2 on at least one side; the weight per area unit of this nonwoven is preferably less than the weight per area unit of the webs 13 laminated onto laminate 1. It is practical if the nonwoven material forming outer layer 3 of elastic laminate 1 has a weight per area unit between 5 g/m$^2$ and 15 g/m$^2$, while the webs 13 laminated onto the laminate 1 have a weight per area unit of more than 20 g/m$^2$, in each instance, preferably a weight per area unit of 24 g/m$^2$ to 35 g/m$^2$. It is practical if the outer layer 3 of the elastic laminate and the webs 13 laminated onto the laminate consist of the same raw material, for example polypropylene fibers. With regard to the fiber structure, outer layer 3 of the elastic laminate and nonwoven webs 13 laminated onto the outside can differ. It is practical if outer layer 3 of elastic laminate 1 has a dense fiber structure, which prevents the layers that have been rolled up into a roll from blocking. It is practical if nonwoven webs 13 that are laminated onto the outside have a loose, voluminous fiber structure, in order to produce a pleasant textile surface structure.

Accordingly, while only a few embodiments of the present invention have been shown and described, it is obvious that many changes and modifications may be made thereunto without departing from the spirit and scope of the invention.

What is claimed is:

1. A method for the production of a fleece laminate material that has elastic regions and non-elastic regions, comprising:
    pulling an elastic laminate from a roll, said elastic laminate having a tacky elastomer core layer and at least one non blocking outer layer of nonwoven material applied to the tacky elastomer core layer, said non blocking outer layer being not elastic in a web direction;
    cutting the elastic laminate into strips;
    guiding the strips by way of deflection devices;
    passing the strips to a laminating device as parallel strips spaced at a distance from one another; and laminating the strips in between two webs of nonwoven material, said strips forming elastomeric regions of the web; and bonding the nonwoven webs directly to one another, in regions between the strips, to form non-elastic regions.

2. A method according to claim 1, wherein the tacky elastomer core layer and the outer layer of the elastic laminate that consists of nonwoven material are bonded by means of extrusion lamination, by means of adhesive lamination, or over part of its area by means of ultrasound.

3. A method according to claim 1, wherein a weight per area unit of the outer layer of the elastic laminate consisting of nonwoven material is less than a weight per area unit of the webs.

4. A method according to claim 3, wherein the outer layer of the elastic laminate has a weight per area unit between 5 g/m$^2$ and 15 g/m$^2$, and each of the webs laminated onto the laminate have a weight per area unit of more than 15 g/m$^2$.

5. A method according to claim 3, wherein the outer layer of the elastic laminate and the webs laminated onto the laminate consist of the same raw material.

6. A method according to claim 1, wherein the elastic laminate contains a monofilm selected from the group consisting of styrene-isoprene-styrene block copolymers, styrene-butadiene-styrene block copolymers, styrene-ethylene/butylene-styrene block copolymers, polyurethanes and ethylene copolymers.

7. A method according to claim 1, wherein the laminate material is stretched crosswise to the web direction, in the elastic regions, by means of ring rolling.

* * * * *